Oct. 19, 1971   J. V. FISHER   3,613,178
PLASTIC CLIP DEVICE
Filed Dec. 13, 1968
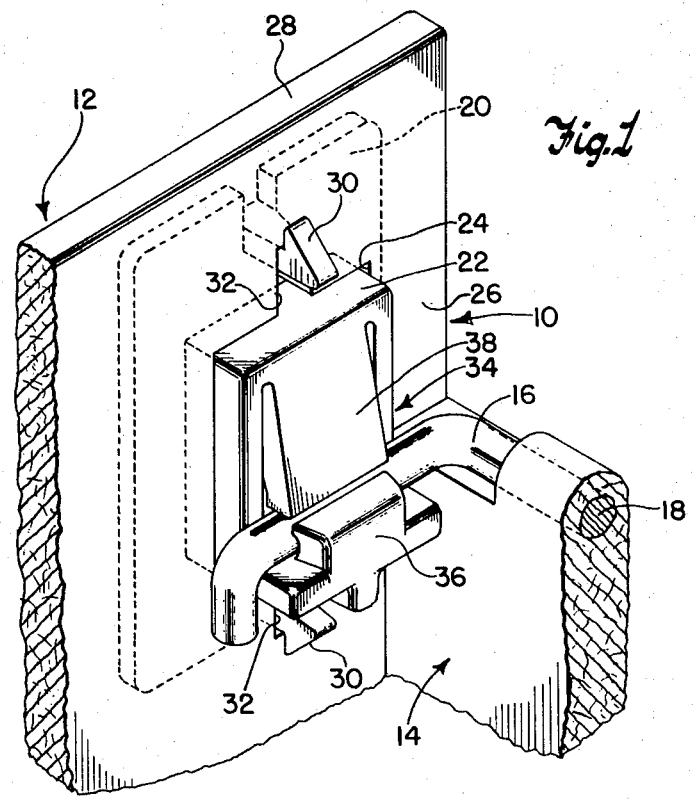
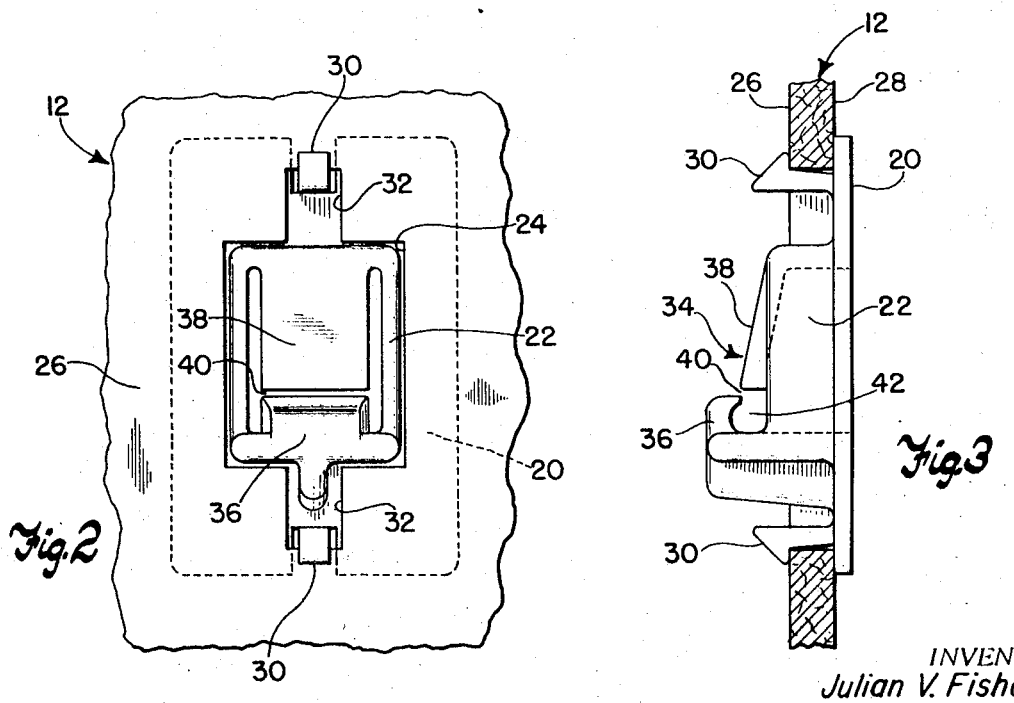
INVENTOR.
Julian V. Fisher
BY
His Att'ys

United States Patent Office 3,613,178
Patented Oct. 19, 1971

3,613,178
PLASTIC CLIP DEVICE
Julian Vernon Fisher, Carpentersville, Ill., assignor to Illinois Tool Works Inc., Chicago, Ill.
Filed Dec. 13, 1968, Ser. No. 783,636
Int. Cl. A44b 21/00
U.S. Cl. 24—73 PF          3 Claims

ABSTRACT OF THE DISCLOSURE

A plastic clip for connecting perpendicular panels. The clip has a planar head portion with a rearwardly directed shank portion and prong connector elements. The rear of the shank portion defines a yieldable throat area opening to a socket. The shank portion of the clip is inserted into an opening in one of the panels and held in the opening by the prong connector elements. An arm element is secured to the other panel and the panels are perpendicularly connected by pressing the arm element on the second panel through the yieldable throat into the socket of the clip on the first panel.

---

Collapsible filing drawers presently being made are initially shipped in a collapsed or "knock-down" condition and are assembled when the need arises. The side panels of such collapsible filing drawers are provided with elongated rods which reinforce the side as well as the front and rear panels which are connected thereto. It is the current practice, as disclosed in U.S. Pat. No. 2,723,073, to provide looped ends for the elongated rods into which screws are positioned for joining the front and rear panels to the side panels through the use of a nut element or the like. As will be appreciated, such fastening techniques are not only manipulatively difficult, but they are time consuming also. This is inconsistent with the basic desire of providing a collapsible filing drawer which can be assembled or disassembled with speed, efficiency and ease by the average office worker.

Accordingly, it is an object of the present invention to provide a plastic clip device for a collapsible filing drawer or the like which overcomes the aforementioned difficulties.

More specifically, it is anobject of the present invention to provide a one-piece plastic clip for securing adjacent substantially normal panels of a collapsible filing drawer or the like which permits assembly and disassembly thereof in an expeditious and efficient manner, without the need for special tools or fasteners, and can be manufactured and used in a more economical manner than other prior art devices.

These and other objects and advantages of the present invention are attained by the provision of a one-piece plastic clip device which secures adjacent substantially normal panels of a fibrous drawer or the like, the clip device including a shank portion for extending through an aperture which is provided in one of the panels and beyond an inner face thereof, a head portion integral with the trailing end of the shank portion for overlying the outer face of the apertured panel, and panel connecting means provided on the shank portion for retaining an arm element joined to the other substantially normal panel for thereby securing the panels to each other.

Reference is now made to the drawings wherein:

FIG. 1 is an enlarged fragmentary perspective view of a plastic clip device constructed in accordance with the present invention and illustrating the manner in which it is used to secure adjacent, substantially normal panels of a collapsible filing drawer, such panels being fragmentarily illustrated;

FIG. 2 is a front elevational view of the plastic clip device mounted in position relative to an apertured panel; and FIG. 3 is a side elevational view, partially in section, further illustrating the manner in which the plastic clip device is mounted an apertured panel or the like.

As is generally understood, a collapsible filing drawer is made from a one-piece sheet of relatively flexible fibrous material such as corrugated board, and includes creases or folds at selected locations for positioning sections or panels of the sheet adjacent to one another to form a container, the particular outline being dependent upon the location of the folds or creases in the sheet. For a specific description of one type of collapsible filing drawer which is currently being manufactured, reference is made to U.S. Pat. No. 2,723,073.

The plastic clip device generally designated 10 in the drawing is adapted to be mounted to an apertured panel 12 and capable of securing and adjacent, substantially normal panel 14 thereto through an arm element 16 which is attached or mounted to the panel 14. The arm element 16 is generally right angular extension of the elongated rod 18 which is secured to the panel 14 and serves as a reinforcing element therefor. The attachment of the arm element 16 to the clip device 10, which itself is secured to the apertured panel 12, provides a unitary structure between the two panels 12, 14. It will be appreciated that additional plastic clip devices 10 will be mounted adjacent other corner locations of the finally assembled package as may be useful and desired.

The plastic clip device 10 is made as a one-piece injection molded plastic part from a suitable plastic material, polypropylene being one preferred example. The plastic clip device 10 includes a head portion or base 20 at one end thereof to which is attached a shank portion 22, the latter being designed to extend through the complementary shaped aperture 24 provided in the panel 12 and beyond the inner face 26 thereof so that it will expose the panel connecting means which secures the arm element 16 to the plastic clip device 10. When the plastic clip device 10 is thus assembled to the apertured panel 12 as illustrated in the drawing, the enlarged head portion or base 20 at the trailing end of the shank portion will overlie the outer face 28 of the apertured panel, and it will be apparent that this is for the purpose of preventing movement of the plastic clip device toward and beyond the inner face 26 of the panel 12.

As illustrated in the drawing, the shank portion 22 is preferably polygonally shaped and fits within a complementary shaped aperture 24 to prevent rotation of the part within the apertured panel 12; however, it will be appreciated that the shank portion can have a general cylindrical configuration, and if desired, include means preventing rotation thereof. In the same manner, while the head portion 20 is illustrated as being of generally rectangular configuration, other shapes may be selected as desired, in keeping with the intended purpose or function of the head portion 20.

Preferably, the plastic clip device 10 includes one or more prong elements 30 integrally attached to and extending from the head portion or base 20 and generally the same direction as the shank portion 22. The prong elements 30 are designed to be positioned within complementary shaped openings 32 provided in the apertured panel 12 for at least temporarily supporting and securing the plastic clip device 10 to the apertured panel. As illustrated in the drawing, a pair of generally opposed prong elements 30 are provided, the pair of prong elements having a greater dimension therebetween than the maximum distance between the outermost margins of the complementary shaped openings 32 so that when the plastic clip device is assembled to the apertured panel 12, the prong elements 30 will engage the front face 26 of the apertured panel 12 with the undersurface of the head portion 20 abutting or in close proximity to the outer face 28 of the apertured panel 12.

As an important feature of the present invention, there is provided panel connecting means 34 integrally associated with the shank portion 22 of the plastic clip device 10 which is capable of receiving and releasably mounting the arm element 16 of the panel 14 in the position illustrated in FIG. 1 of the drawing. In the illustrated embodiment, the panel connecting means 34 comprises first and second locking sections 36, 38 which cooperate to define a restricted throat area 40 into which the arm element 16 is positioned. The panel locking section 36 is illustrated as comprising a fixed shoulder which is integrally joined to the shank portion 22 generally at one side thereof and includes a reversally bent tip or curved portion which is designed to prevent removal or withdrawal of the arm element 16 when received within the socket 42. The other or second locking section 38 generally comprises a depending tongue section which is integrally attached to the other side of the shank portion 22 in a manner to provide an exposed, outwardly directed, flexible element. The second locking section 38 is designed to flex generally in the vicinity of its juncture with the shank portion 22, and in so doing, it can be readily moved inwardly when the arm element 16 is disposed in the vicinity of the restricted throat 40 and then moved within the confines of the socket 42. Because the shank portion 22 is preferably formed as a hollowed out body member, the flexible tongue or second locking section 38 can be moved at least partially within the confines thereof. On the other hand, the shank portion 22 may be solid, rather than hollowed out, and the flexible tongue or second locking section 38 will be configured and shaped in the desired manner to achieve this purpose.

From the foregoing, it will now be appreciated that the present invention contemplates a unique one-piece plastic clip device which is capable of securing adjacently positioned, substantially normal panels or wall elements relative to one another, and at the same time permit ease, speed, and efficiency in assembling and disassembling the panels or wall elements relative to one another, all in a manner not heretofore made possible or suggested by the prior art.

I claim:

1. A one-piece plastic clip device for securing adjacent substantially normal panels of a fibrous drawer or the like, said clip device including a shank portion for extending through an aperture provided in one of said panels and beyond an inner face thereof, a head portion integral with the trailing end of said shank portion for overlying the outer face of said apertured panel, and panel connecting means provided on said shank portion for retaining an arm element joined to said other substantially normal panel and thereby securing said panels to each other, said panel connecting means comprising first and second locking means cooperating to define a restricted throat area into which said arm element is positioned, at least one of said first or second locking means being flexible to permit subsequent attachment and withdrawal of said arm element relative to said panel connecting means.

2. The clip device as defined in claim 1 wherein each of said flexible locking means comprises a depending tongue section at least partially closing the restricted throat area defined by said first and second locking means.

3. The clip device as defined in claim 2 wherein said shank portion is hollowed out to permit movement of at least said flexible depending tongue section therewithin.

References Cited

UNITED STATES PATENTS

| 2,873,496 | 2/1959 | Elms | 24—73.8 SA |
| 3,197,265 | 7/1965 | Rand | 312—263 X |
| 3,342,095 | 9/1967 | Buntic | 24—73.8 P |
| 3,422,500 | 1/1969 | Munse | 24—73 PMF |

FOREIGN PATENTS

| 418,735 | 2/1967 | Switzerland | 24—73 PMF |

BILLY S. TAYLOR, Primary Examiner